United States Patent [19]

Flanner et al.

[11] 4,169,384

[45] Oct. 2, 1979

[54] LINEAR ACCELEROMETER MECHANISM

[75] Inventors: Philip D. Flanner, Pleasant Hill; George G. Malcom, Walnut Creek, both of Calif.

[73] Assignee: Systron-Donner Corporation, Concord, Calif.

[21] Appl. No.: 862,389

[22] Filed: Dec. 20, 1977

Related U.S. Application Data

[63] Continuation-in-part of Ser. No. 725,030, Sep. 20, 1976, abandoned.

[51] Int. Cl.² ............................................. G01P 15/08
[52] U.S. Cl. .................................. 73/516 R; 73/517 B
[58] Field of Search ............ 73/497, 503, 515, 516 R, 73/517 B, 517 R; 318/648, 651, 676

[56] References Cited

U.S. PATENT DOCUMENTS

| | | | |
|---|---|---|---|
| 2,939,072 | 5/1960 | Bell | 73/517 B |
| 2,946,226 | 7/1960 | Wendt et al. | 73/517 B |
| 3,133,446 | 5/1964 | Cohen | 73/517 B |
| 3,176,521 | 4/1965 | Clark | 73/517 B |
| 3,331,253 | 7/1967 | Morris | 73/517 B |
| 3,680,393 | 8/1972 | Rogall | 73/517 B |

*Primary Examiner*—James J. Gill
*Attorney, Agent, or Firm*—Flehr, Hohbach, Test, Albritton & Herbert

[57] ABSTRACT

Linear accelerometer mechanism having a mounting flange with an opening therein. A body is to be carried by the mounting flange and also has an opening therein. A float, a pendulous elongated member having one end secured to the float and a cylindrical torque coil secured to the other end of the pendulous member are disposed in the opening of the body. Means is provided for pivotally mounting the float, the pendulous member and the torque coil in the body to permit pivotal movement about a pivot axis. A planar conducting element is carried by the pendulous member. Pickoff means is carried by the body adjacent to the planar conducting element. First and second covers are disposed on opposite sides of the flange and close the body and are secured to the flange to aid in providing liquid-tight seals between the covers and the flange.

23 Claims, 11 Drawing Figures

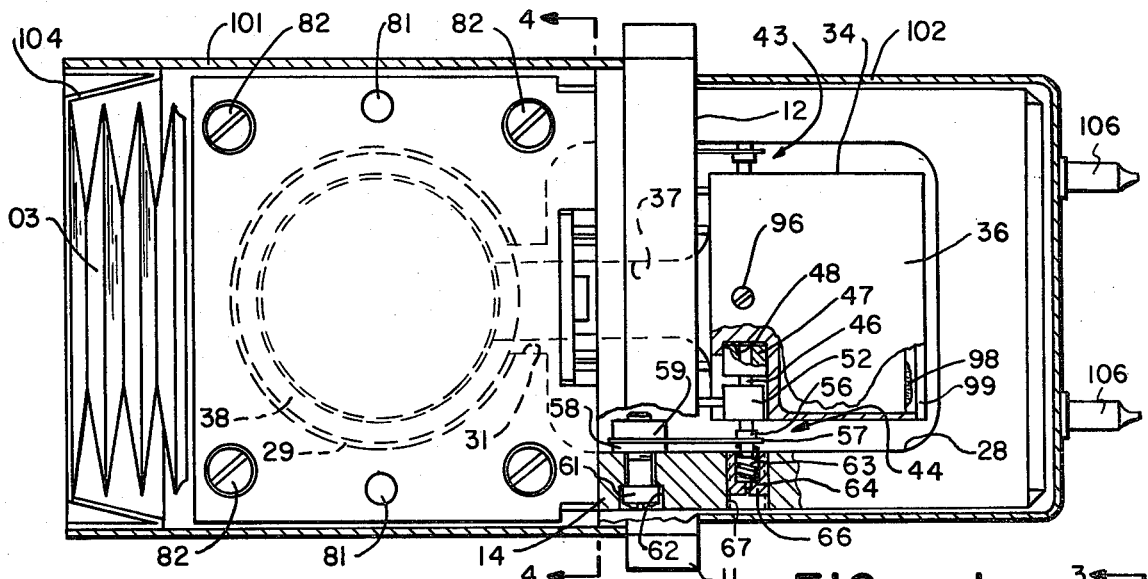
FIG.—1
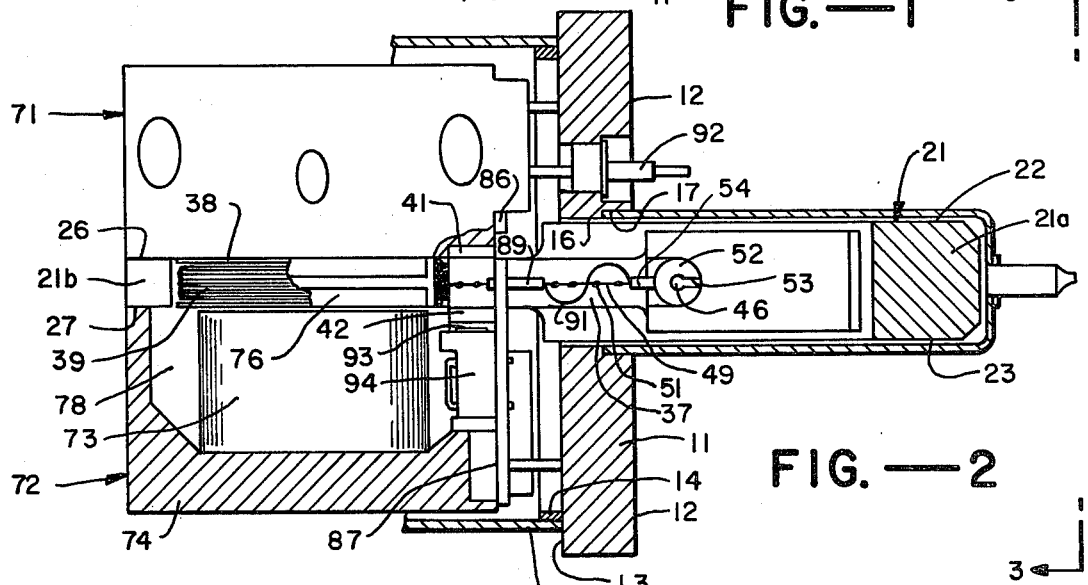
FIG.—2
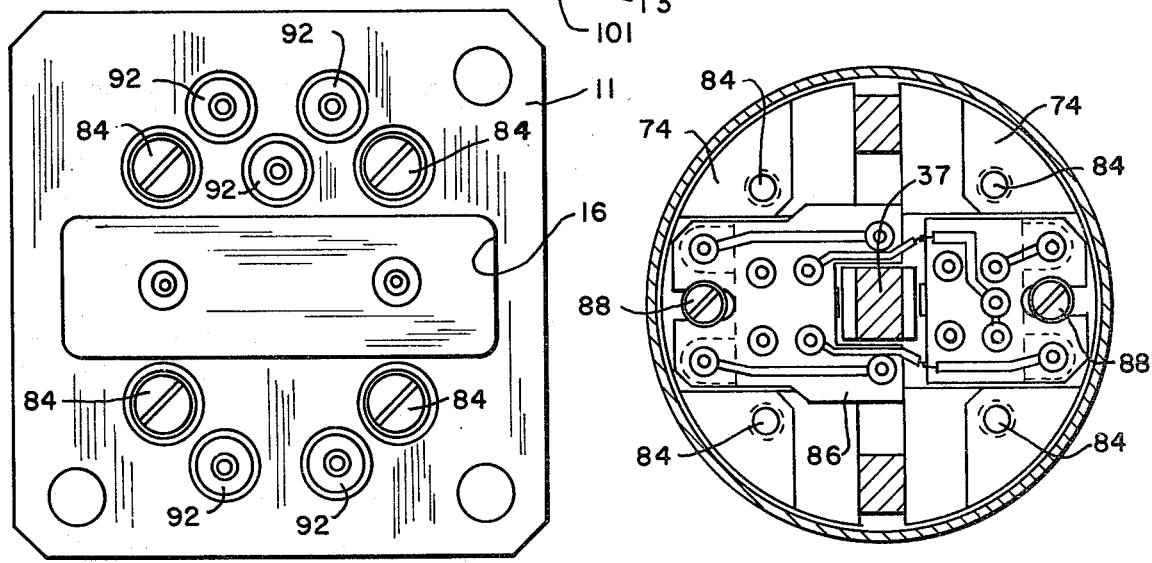
FIG.—3  FIG.—4

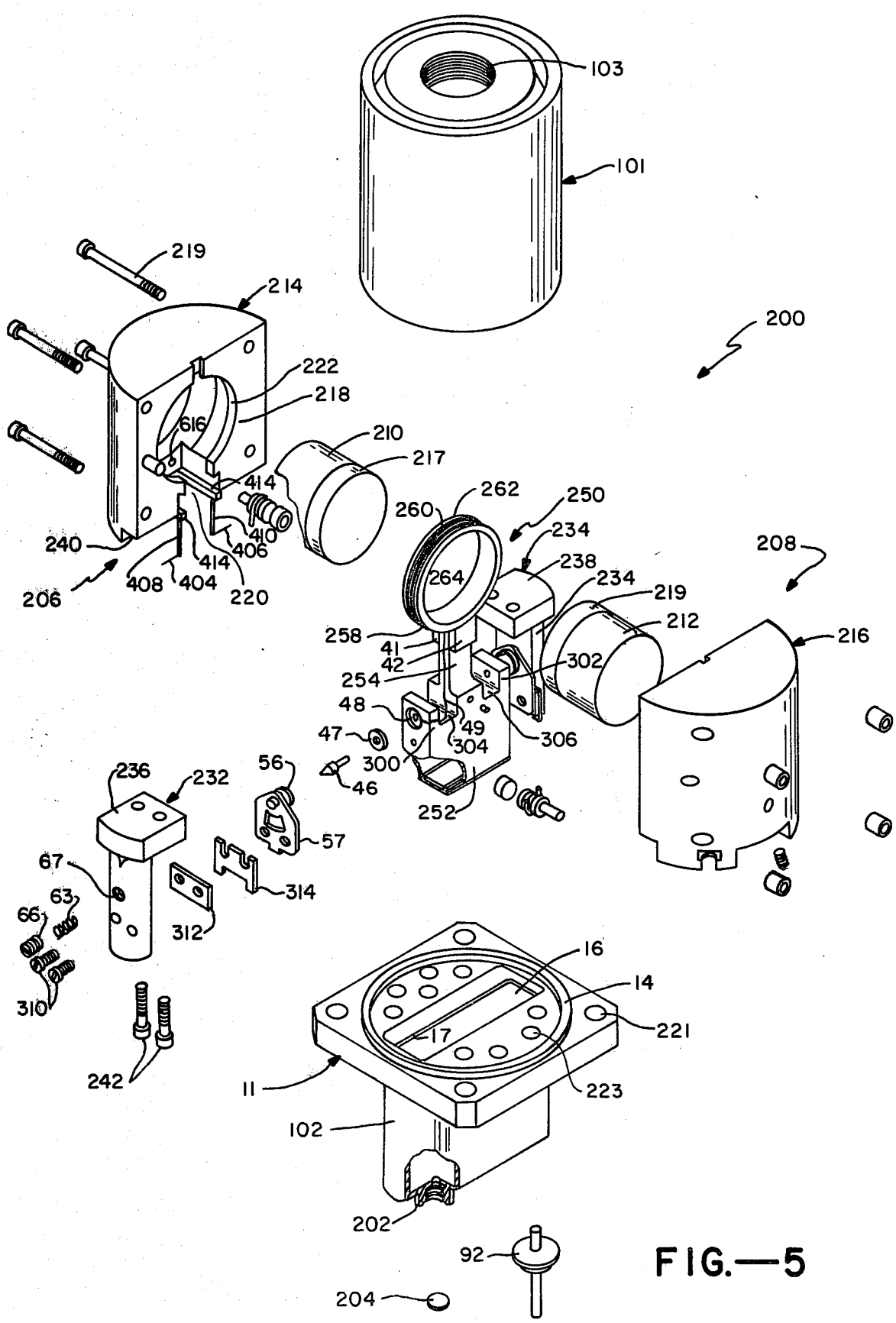
FIG.—5

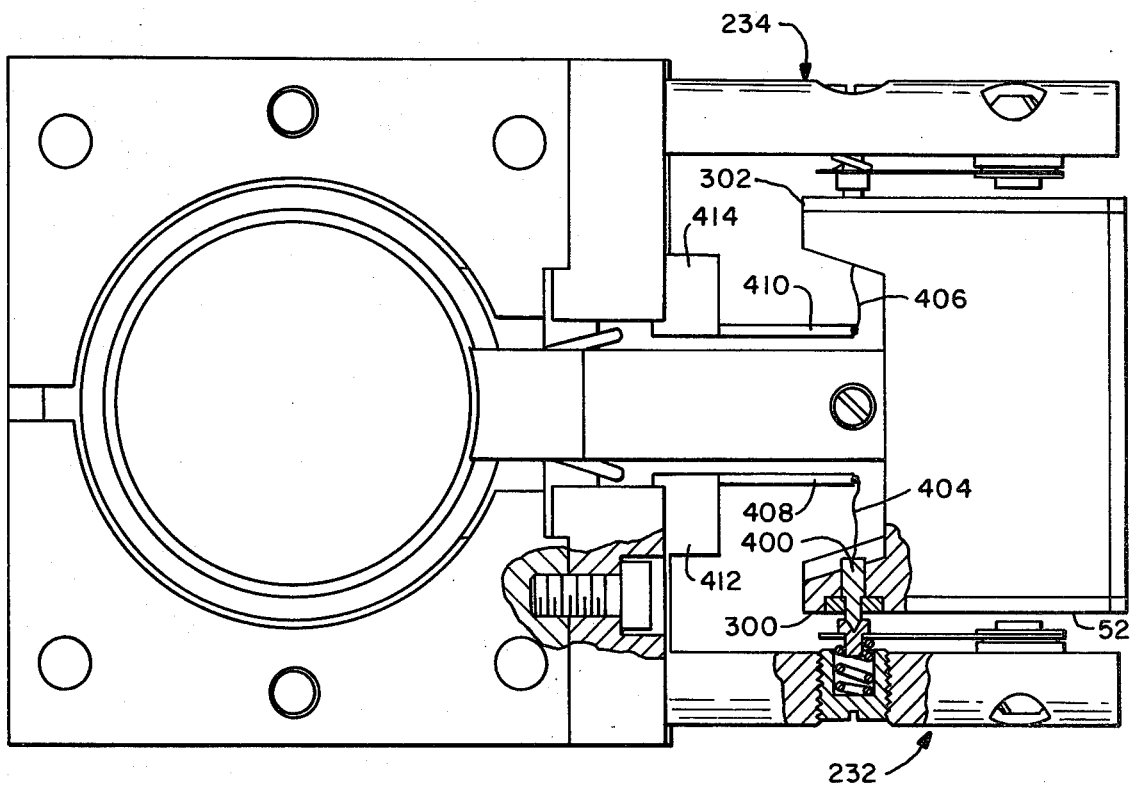
FIG.—6
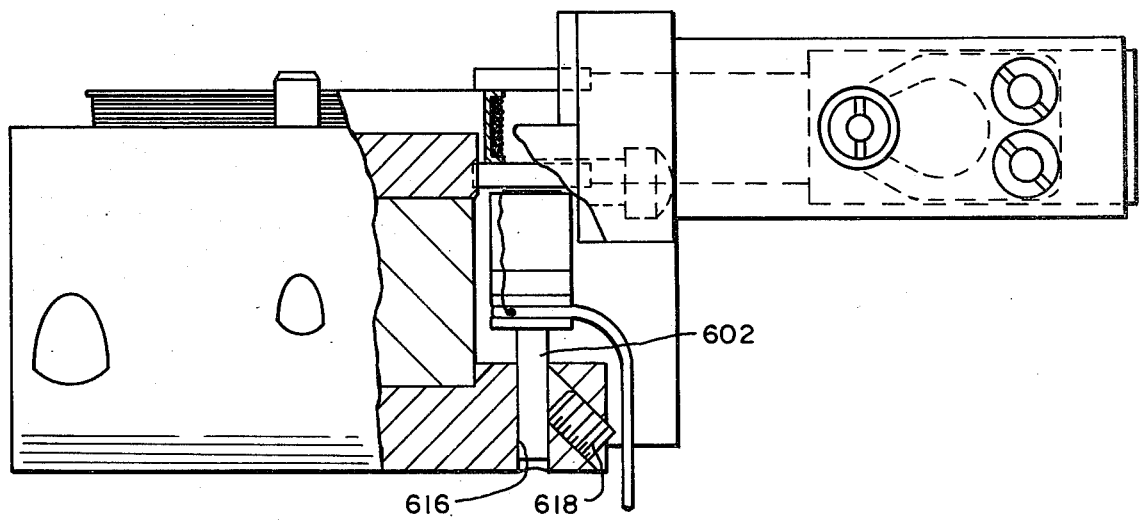
FIG.—7

U.S. Patent  Oct. 2, 1979  Sheet 4 of 4  4,169,384
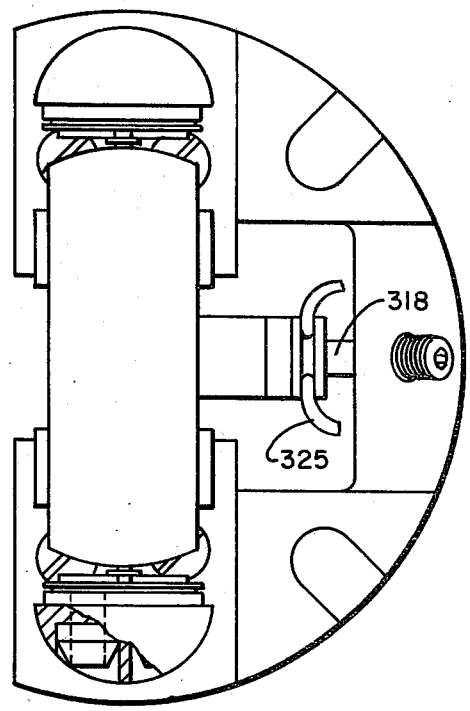
FIG.—8
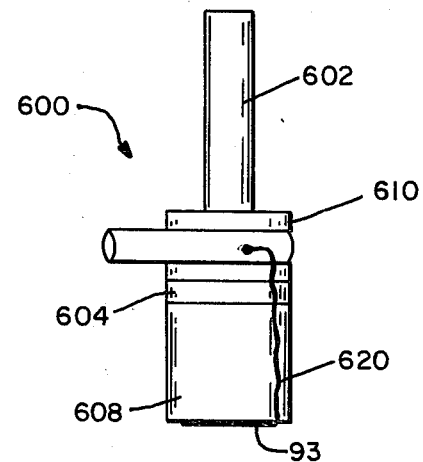
FIG.—9
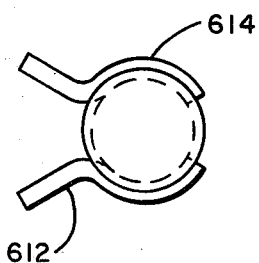
FIG.—10
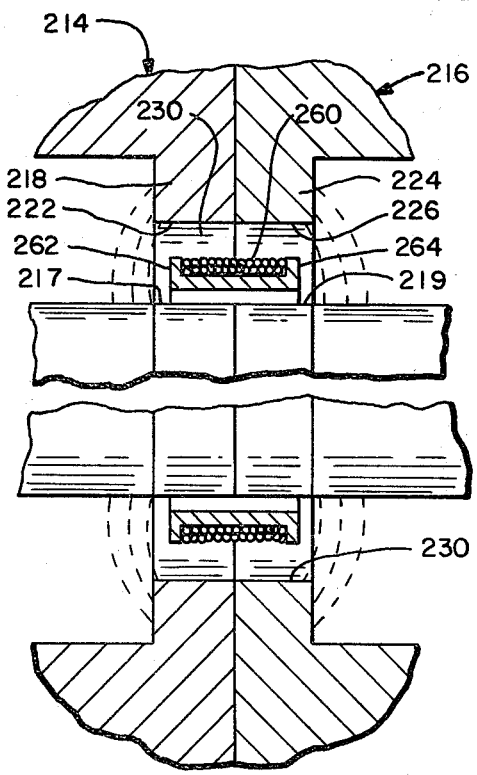
FIG.—11

LINEAR ACCELEROMETER MECHANISM

REFERENCE TO PARENT APPLICATION

This application is a continuation-in-part of co-pending Application Ser. No. 725,030 filed Sept. 20, 1976, entitled LINEAR ACCELEROMETER MECHANISM, now abandoned.

BACKGROUND OF THE INVENTION

In copending application, Ser. No. 613,449, filed on Sept. 15, 1975, now abandoned there was disclosed a linear accelerometer mechanism. However, in construction of same, it has been found that it has a size which is larger than desired for certain applications. In addition, difficulties have been encountered in obtaining good seals between the three part housing therein provided. Therefore there is need for a new and improved linear accelerometer mechanism.

SUMMARY OF THE INVENTION AND OBJECTS

The linear accelerometer mechanism of one embodiment of the present invention consists of a mounting flange which has an opening therein. A body is carried by the mounting flange and also has an opening therein. A pendulous assembly consisting of a float, a pendulous elongate member having one end secured to the float and a cylindrical torque coil secured to the other end of the pendulous member are disposed within the opening in the body. Means is provided for pivotally mounting the pendulous assembly in the body for pivotal movement about a pivot axis. A planar conducting element is carried by the pendulous member and moves with the pendulous member. Pick-off means is carried by the body adjacent to the planar conducting element. First and second covers are disposed on opposite sides of the flange and serve to enclose the body and are secured to the flange to aid in providing liquid-tight seals between the covers and the flange.

In a second embodiment, the pendulous assembly is pivotally mounted to a pair of support members fixedly connected to a magnet assembly which also comprises part of the overall linear accelerometer mechanism. The magnet assembly is in turn mounted to the mounting flange referred to above.

In general, it is an object of the invention to provide a linear accelerometer mechanism which is small in size.

Another object of the invention is to provide a linear accelerometer mechanism of the above character which can be readily sealed.

Another object of the invention is to provide a mechanism of the above character in which the mass to mass unbalance ratio has been made smaller.

Another object is to provide a mechanism of the above character in which light materials have been utilized for certain of the parts to make it possible to reduce the size of the mechanism.

Another object is to provide a mechanism of the above character which has improved reliability under thermal cycling.

Another object is to provide a mechanism of the above character which has improved reproducibility.

Another object is to provide a mechanism of the above character which electrically connects each torque coil to points removed from the overall pendulous assembly in an improved way.

Another object is to provide a mechanism of the above character which includes improved pick-off means and particularly an improved support for its pick-off sensor.

Another object is to provide a mechanism of the above character which includes an improvement in the way in which its magnet assembly and torque coil cooperate with one another.

Additional objects and features of the invention will appear in the following description in which the preferred embodiment set forth in detail in conjunction with the accompanied drawings.

BRIEF DESCRIPTION OF THE DRAWINGS

FIG. 1 is a cross-sectional view showing a linear accelerometer mechanism incorporating the present invention and constructed in accordance with one embodiment.

FIG. 2 is a view partly in the cross-section of the linear accelerometer mechanism showin in FIG. 2 at right angles to the view shown in FIG. 1.

FIG. 3 is a view looking along the line 3—3 of FIG. 2.

FIG. 4 is a cross-sectional view taken along the line of 4—4 of FIG. 1.

FIG. 5 is an exploded perspective view of a linear accelerometer mechanism incorporating the present invention and constructed in accordance with a second embodiment.

FIG. 6 is a plan view, partially broken away, of the mechanism of FIG. 5, partially unassembled, for better illustrating some of the components making up the mechanism.

FIG. 7 is a view, partially broken away, of the linear accelerometer mechanism shown in FIG. 6, but at right angles to the view in FIG. 6.

FIG. 8 is a top plan view, partially broken away, of a portion of the linear accelerometer mechanism of FIGS. 6 and 7.

FIG. 9 is a plan view of the one component of the mechanism, which component is specifically illustrated in FIGS. 7 and 8.

FIG. 10 is an end view of the component illustrated in FIG. 9.

FIG. 11 is a schematic illustration of the way a number of the components making up the mechanism illustrated in FIG. 5 cooperate with one another.

DESCRIPTION OF THE PREFERRED EMBODIMENT

The linear accelerometer mechanism incorporating the present invention as shown in the drawings consists of a mounting flange 11 formed of a suitable metallic, weldable material such as aluminum. As can be seen, the mounting flange 11 has an outside perimeter which is rectangular and as shown in generally square. It is provided with two planar parallel surfaces 12 and 13. The mounting flange 11 is provided with an annular lip 14, which extends at right angles to the surface 13. The mounting flange 11 is provided with a rectangular opening 16, which is disposed within the mounting flange 11. A recess 17 is provided in the flange 11, which extends through the surface 12 and surrounds the opening 16.

The body 21, formed of a suitable magnetic material such as steel, is disposed in the opening 16 provided in the mounting flange 11. The body 21 has a perimeter which is generally rectangular. As can be seen from FIG. 2, the body 21 has approximately one half of the same which is of greater thickness than the other one half so that there are provided two spaced parallel planar surfaces 22 and 23, which are spaced farther apart than the two other planar surfaces 26 and 27. A large rectangular opening 28 is provided in the body 21 disposed generally in the thicker portion 21a of the body 21 and a circular opening 29 disposed in the thinner portion 21b of the body 21 with the two openings 28 and 29 being interconnected by a slot 31. If desired, portion 21a can be eliminated to achieve a significant weight reduction and also to minimize the low Q mechanical resonance.

A pendulous assembly 34 is carried by the body 21. The pendulous assembly 34 consists of a large rectangular box-like float 36 formed of a suitable non-magnetic material such as glass-filled nylon. The glass-filled Nylon is desirable material because it is relatively light and still is quite strong. The pendulous assembly 34 also includes a pendulous elongated member 37 which has one end secured to the float 36. The pendulous elongate member 37 is also formed of a suitable non-magnetic material. Also, in order to keep it relatively light and still strong, the pendulous elongate member 37 has also been formed of glass-filled Nylon. A right circular cylindrical bobbin 38 formed of a suitable non-magnetic material, such as aluminum, is secured to the other end of the elongate member 37. A torque coil 39 formed of a conducting copper wire is wound on the bobbin 38. Two planar conducting elements 41 and 42 formed of a suitable conducting material such as aluminum, are formed by the pendulous member. As can be seen, the conducting elements 41 and 42 are secured to the pendulous member by suitable means such as cementing the same to the member in a position which is between the torque coil 39 and the float 36, but adjacent the torque coil 39.

Means is provided for pivotaly mounting the pendulous assembly in the body and consists of pivot and bearing assemblies 43 and 44, which are generally of the type described in the copending application, Ser. No. 613,449, filed on Sept. 15, 1975. Each of the assemblies 43 and 44 consists of a pivot pin 46 which is mounted in a cylindrical piece 47 formed of a suitable material such as brass, the cylindrical piece 47 is mounted in a recess 48 provided in the float 36. A conducting wire 49 is connected to the piece 47 and also is connected to the torque coil 39. The wire 49 is secured to the sides of the elongate member arm 37 by suitable means such as small globs of cement. A cylindrical piece 52 formed of a suitable material such as brass and which is provided with a slot 53 (see FIG. 2) is mounted by a force fit onto the pivot pin 46. It carries a tang 54, which is in electrical contact with the wire 49 and which is adapted to have a wire connected thereto to connect the torque coil 39 to the outside world as hereinafter described. The pivot pin 46 seats in a bearing 56. The bearing 56 is secured to one end of a cantilevered spring 57 which is mounted between a washer 58 and a nut 59 held in place by a screw 61 seated within a bore 62 provided in the body 21. Means is provided for adjusting the force supplied between the pivot pin 46 and the bearing 56 and consists of a spring 63 disposed within a well 64 and carried by a screw 66 threaded into a bore 67 provided in the body 21.

A pair of magnetic assemblies 71 and 72 are provided for establishing a magnetic field in the vicinity of the torque coil 39. The magnet assemblies 71 and 72 consist of a magnet 73 which is seated within a soft iron body 74. The magnet 73 is generally cylindrical and is provided with a cylindrical pole piece 76 which is disposed within the confines of the torque coil 39. The space 78 between the magnet 73 and the soft iron body 74 is filled with a suitable non ferro magnetic material. The magnet assemblies 71 and 72 are seated upon locating pins 81 provided on opposite sides of the body 21. These are then secured to the body 21 by suitable means such as screws 82.

The mounting flange 11 is secured to the magnet assemblies 71 and 72 by screws 84. the electronic circuitry which is utilized in the accelerometer is provided on two printed circuit boards 86 and 87, which are secured to the magnet assemblies 71 and 72 by screws 88. Printed circuit boards 86 and 87 carry terminals 89 which have wires 91 connected thereto which are connected to the tangs 54.

A plurality of terminals 92 are mounted in the mounting flange 11 and are connected to the printed circuit boards 86 and 87 to thereby provide connections to the electronics and to the torque coil 39.

Means is provided for spin compensating the linear accelerometer mechanism and is described in U.S. Pat. No. 4,088,026 and includes a screw 96 which is threaded into the float 36 in the vicinity of the axis of the pendulous assembly 34. A weight 98 is provided on one extremity of the float (see FIG. 1) and is covered by a cover 99 secured to the float. The weight 98 is formed of a suitable nonmagnetic material having a high mass, as for example gold.

Means is provided for enclosing the mechanism hereinbefore described and consists of first and second covers 101 and 102. The cover 101 is generally cylindrical and fits over the outside of the lip 14 and is secured thereto by a suitable means such as welding to provide a liquid tight seal between the mounting flange 11 and the cover 101. The cover 102 is seated within the recess 17 and is welded to the mounting flange 11 to also provide a liquid tight seal. The end of the cover 101 remote from the mounting flange 11 has a bellows assembly 103 mounted therein and having a plate 104, which is welded to the outer end of the cover 101 to also form a liquid tight seal.

The cover 102 is rectangular in cross-section. The cover 102 is provided with a pair of terminals 106 which are utilized for filling the linear accelerometer mechanism with oil. During the filling operation, oil is introduced through one of the terminals and the other terminal is utilized to allow oil to flow through the mechanism to assure complete filling. As soon as the assembly is filled with oil, the two terminals 106 are closed with solder to provide air tight seals so that the mechanism is completely sealed.

In assembly of the mechanism, the pendulous moving assembly or system 34 is mounted within the body 21. The magnetic circuit is then completed by securing the magnet assembly 71 and 72 to the body 21. The covers 101 and 102 are welded to the flange 11. The body 21 with the magnet assembly 71 and 72 secured thereto is then slipped into the welded assembly of the flange 11 and the covers 101 and 102 and is fastened in place by the screws 84 extending into the magnet assemblies and holding the body in place. The bellows assembly 103 and the plate 104 are then inserted into the cover 101 and welded around the joint formed by the plate 104 and the cover 101. After the oil filling operation is completed as hereinbefore described, the terminals 106 are soldered shut. In addition, the screw heads are covered with cement to ensure that the entire mechanism is liquid and air tight.

Operation and use of the linear accelerometer is substantially similar to that described in U.S. Pat. No. 4,088,026.

A pickoff coil 93 is associated with each of the planar conducting elements 41 and 42 and is carried by a mounting block 94 mounted on the respective printed circuit boards 86 and 87.

With the present construction it can be seen that the mass to mass unbalanced ratio has been made smaller by the use of lighter materials in the pendulous moving system. The glass-filled Nylon has been utilized in the moving system because it is light and is temperature stable. The construction has also made it possible to make the accelerometer substantially smaller in volume, generally cylindrical in construction and shorter in length. The decrease in length is made possible by the fact that the planar conducting elements or the paddle have been moved from the remote side of the torque coil to the other side of the torque coil between the pivot axis and the torque coil. This makes it possible to shorten the accelerometer. Although this decreases the length of the arm carrying the planar conducting elements, it has been found that the arm length provided is more than adequate in connection with the high gain electronics which may be provided on the printed circuit boards 86 and 87 to acheive a very satisfactory output.

The construction of the mechanism is also advantageous in that it is possible to provide excellent seals by the use of the two separate covers which are welded to the mounting flange. This prevents leaks and greatly improves the reliability of the accelerometer under thermal cycling. It also greatly increases the reproducibility of the accelerometer under mass production techniques.

Having described the linear accelerometer mechanism illustrated in FIGS. 1 to 4, attention is now directed to FIGS. 5 to 11 which illustrate a linear accelerometer mechanism constructed in accordance with a second embodiment of the present invention. This mechanism, which is generally designated by the reference numeral 200 in FIG. 5, is provided to function in the same manner as the previously described mechanism and includes many components which are identical to the components previously described. In fact, all of the components making up the linear accelerometer mechanism 200 cooperate with one another and operate in the same manner as the previously described components, unless otherwise noted hereinafter. Accordingly, in order to minimize repetition and simplify the description of linear accelerometer mechanism 200, those components which make up this mechanism and which are identical to previously described components will be designated by the same reference numerals and will only be discussed where necessary.

Turning now specifically to FIG. 5, it can be seen that mechanism 200 includes previously described mounting flange 11 which, as stated, includes annular lip 14, rectangular opening 16, and recess 17 around opening 16. Mechanism 200 also includes a housing which may be identical to previously described housing 102 and hence is designated by this reference numeral. However, it should be noted that the opening in the housing illustrated in FIG. 5 for introduction of coil is threaded. This opening, generally designated at 202, is threaded so that fixtures utilized in filling the accelerometer mechanism with oil during the filling operation can be internally threaded and fixed thereto. As soon as the assembly is filled with oil, the fixture can be removed and a soft steel ball 204 can be dropped into the threaded cavity and welded in place to provide a liquid and air tight seal. A second opening (not shown) would be provided, and, moreover, the housing would include previously described terminals 92. A housing identical to previously described housing 101 including bellows assembly 103 and plate 104 comprises part of the mechanism 200 and, is suitably connected to the opposite surface of flange 11 in the manner previously described. In this way, the two covers and the flange cooperate to provide a housing within which many of the components to be described are located.

Linear accelerator mechanism 200, like the previously described mechanism, includes a pair of magnetic assemblies 206 and 208 which are provided for producing a linear magnetic field and which functionally are identical to the previously described assemblies 71 and 72. Accordingly, each of these assemblies includes an associated magnet 210, 212 which is seated within a soft iron body 214, 216. The magnets are generally cylindrical and each is provided with a cylindrical pole piece 217, 219. As in the previous embodiment, the space between each of the magnets and its associated body is filled with a suitable nonferromagnetic material. The assemblies are joined together by means of screws 219 which extend through cooperating openings in body 214 and 216. These bodies are also suitably screw mounted to flange 11 utilizing the openings 223 and associated screws (not shown).

As seen in FIG. 5, body 214 includes a continuous flanged section 218 which, with the exception of a small discontinuation indicated at 220, defines an annular or substantially annular lip 222 which, when the linear accelerometer mechanism is assembled, is in coaxial and confronting relationship with its associated pole piece 217, as will be discussed with respect to FIG. 11. Body 216 includes a similar flange 224 and annular or substantially annular lip 226, as illustrated in FIG. 11.

Turning now to FIG. 11, the two magnetic assemblies are shown assembled together. As seen in this assembled condition, the two lip surfaces 222 and 226, come together to form a continuous axially extending, substantially annular surface. In like manner, the two pole pieces 217 and 219 come together to define a second axially extending, annular surface which is of the same length as the combination of surfaces 222 and 226 and which is coaxially aligned with these latter surfaces so that together they define an axially extending gap 230 which is substantially annular in configuration. Actually the gap does include a break in its annular configuration, specifically related to previously referred to break 220. For reasons to be discussed hereinafter, this gap, across which the magnet assemblies apply a linear magnetic field, is of a specific predetermined length as defined by the extent of surfaces 222 and 226 and the pole pieces.

Having described magnet assemblies 206 and 208, at least for the time being, attention is now directed to the manner in which these assemblies are mounted in flange 11. To accomplish this, the linear accelerometer mechanism includes removable means, specifically two elongated support members 232 and 234, each of which includes an enlarged, somewhat box shaped upper flange 236 and 238, respectively. The flange 236 is adapted to fit within a cooperating slot 240 which is in part defined in the bottom side of body 214 of magnet assembly 206 and in part is defined in the underside of body 216. Suitable screws 242 are provided to extend through the flange and into cooperating openings in the bodies 214 and 216 to hold support member 232 in place. The flange 238 is held in position to the magnetic assembly bodies in the same manner, on the opposite side of discontinuation 220. In this manner, the two elongated members depend down from the magnet assemblies and confront one another so as to define parallel confronting surfaces, as best seen in FIG. 6. As will be seen below, these two support members extend through opening 16 in flange 11 and are provided for pivotally supporting the linear accelerometer mechanism's pendulous assembly to be described below.

As seen in FIG. 5, mechanism 200 includes a pendulous assembly 250 which functionally may be identical to the previously described assembly. As a result, assembly 250 includes a somewhat box like float 252 which, with the exceptions to be noted below, is identical, at least in function, to the previously described float and a pendulous elongate member 254 having one end secured, actually integrally formed with, the float. Like their previously described corresponding members, the float 252 and the pendulous elongate member 254 are preferably formed of a suitable non-magnetic material such as glass filled nylon.

In addition to the float 252 and pendulous elongate member 254, the pendulous assembly 250 includes a cylindrical bobbin 258 identical to previously described bobbin 38 and secured to the other end of the elongate member. A torque coil 260, identical to previously described torque coil 39, is formed of a conducting copper wire and is wound around the bobbin. For reasons to be discussed below, this torque coil is of a specific predetermined length, the opposite sides 262 and 264 of the bobbin defining the extent of this length. As can be seen in FIG. 5, the previously described conducting elements 41 and 42 are secured to the pendulous member by suitable means such as cement in a position between the torque coil and the float, on opposite sides of the pendulous elongate member.

Returning to FIG. 11, in conjunction with FIG. 5 and FIG. 6, it can been seen that the torque coil 260 and its associated bobbin 258 are positioned coaxially within the previously described gap 230 defined by the magnetic assemblies 206 and 208. This is done for the same reasons that the previously described torque coil is positioned within the previously described magnetic assemblies, that is, so that the torque coil can be exposed to the field produced by the magnetic assemblies. However, in accordance with one respect of the present invention, the magnetic assemblies of the present embodiment have been designed so that the axial length of gap 230 is longer, preferably one and one-half times longer, than the axial length of the torque coil, as specifically seen in FIG. 11. Moreover, as will be seen hereinafter, the entire pendulous assembly is supported such that when it is in its normal operating position, the torque coil is centered within the gap. This insures exposure of the torque coil to the linear field which develops across the gap as indicated by the straight dotted arrows. Should the torque coil move outside the gap, for example if the pendulous assembly tends to pivot, it would encounter a non-linear magnetic field fringe which develops outside the gap and which is indicated by the curved dotted lines in FIG. 11. However, by designing the magnet assemblies to define a gap which is longer than the torque coil, specifically one and one half times longer, in a preferred embodiment, the torque coil is required to travel that extra distance before encountering the non-linear fringe area, and hence the added distance provides insurance againt this occuring.

Returning to FIG. 5 in conjunction with FIG. 6, attention is specifically directed to float 52. As stated above, this float is somewhat box like in shape, like previously described float 36. However, float 252 includes a pair of flanges 300 and 302 extending in the direction of and spaced from the pendulous member 254 on opposite sides thereof. As seen in both FIGS. 5 and 6, these flanges extend up toward the torque coil and together with the elongate member 254 define spaces 304 and 306. The significance of these flanges and spaces will be discussed hereinafter.

Mechanism 200 includes means for pivotally mounting the pendulous assembly which means may be identical to the previously described means illustrated in FIGS. 1 and 2, specifically, pivot and bearing assemblies 43 and 44. Accordingly, each of these bearing assemblies 43 and 44 of linear accelerometer mechanism 200 being identical includes an electrically conductive pivot pin 46 which is mounted in the cylindrical piece 47 formed of a suitable material such as brass and the cylindrical piece is mounted in a recess 48 provided in flange 300 and 302 respectively. Each of the pivot pins 46 seats in a bearing 56 which is secured to one end of a cantilevered spring 57. The cantilevered spring is mounted to an associated support member 232 by means of screws 310 but is spaced from the support member by means of a fixed spacer 312 and an adjustable spacer 314. In this regard, it should be noted that the particular method of mounting the cantilevered spring is somewhat different from previously described. However, similar means is provided for adjusting the force applied between the pivot pin 46 and the bearing 56 and includes spring 63 disposed within bore 67 and carried by screw 66 threaded into the bore provided in support member 232. With the pendulous assembly mounted in this manner, it can be readily seen that it is pivotally movable about the predetermined pivot axis as defined by the pivot pins 46.

Having described pendulous assembly 250 and the manner in which it is mounted to the support members 232, attention is now directed to the manner in which the torque coil 260 is electrically connected to the outside world. In the previous embodiment, this was accomplished by means of conducting wire 49 connected to the piece 47 and also to the torque coil. The wire 49 was secured to the sides of the elongate member by suitable means such as small globs of cement. A cylindrical piece 52 which carried with it tang 54 was provided in the pivot pin 46. The wires 91 were connected to these tang and to the printed circuit boards 86 and 87. As will be seen below, the connection of the torque coil to the outside world in the mechanism 200 is entirely different and has certain advantages over this previously described method.

As seen best in FIG. 6 in conjunction with the FIG. 5, the same electrical lead 49 is provided between the torque coil and the cylindrical piece 47. Moreover, as stated above, the cylindrical piece is mounted by force fit onto the pivot pin. Accordingly, there is now provided electrical conductivity from the torque coil through wire 49 and cylindrical piece 47 to the pivot pin 46. However, unlike the previously described embodiment, access is provided to the back side of the pivot pin 46 in the float by means of spaces 304 and 306. While this is the primary reason for the spaces as will be seen, it should be pointed out that they also provide a reduction in mass of the pendulous assembly at no sacrifice to pendulosity because equal amounts of mass are symmetrically removed along the pivot axis.

As best seen in FIG. 6, a small diameter hole or opening 400 is provided in the back end of each pivot pin 46 along the center line of the cylindrical axis of the pin. Access to this hole or opening is provided by space 304 (and space 306). Small gauge wires 404 and 406 are respectively inserted in the holes and connected with solder so as to provide electrical conductivity from the pins to the wires. The other ends of these wires are respectively connected to rigid bodies 408 and 410, actually fixed posts, formed of suitable electrically conductive material such as copper, by suitable means such as solder so as to provide electrical continuity between the wires and the rigid bodies. It should be noted that the points of attachment between the wires 404, 406 and the rigid members 408, 410 lie on the previously discussed pivot axis defined by the pivot pins. Moreover, it should be noted that the two wires which otherwise remain unconnected, that is, between its points of connection to the pivot pins and rigid members, extend in directions coincident with the pivot axis. The wires are of sufficient length so as not to be subjected to tautness during accelerometer operation. Locating slack wires 404 and 406 coincident with the pivot axis of the pendulous assembly as just described, results in a reduced moment arm for all forces applied to the pendulous assembly about the pivot axis as a direct result of the mechanical attachment. In other words, in the previous embodiment described, the slack wire 91 and its associated tang 54 define a moment arm which might result in a small torque to the system resulting from expansion, contraction and/or vibration of the movable wire 91. By locating the slack wire 404 and 406 coincident with the pivot axis, the moment arm is substantially eliminated, which reduces or substantially eliminates any undesirable torque variation about the pendulous assembly pivot axis during and as a result of thermal expansion and contraction of the wires. Moreover, this configuration reduces or substantially eliminates any torque variation about the pivot axis during mechanical perturbations, again because of their particular positions.

The two rigid bodies 408 and 410 are mounted to and depend from respective support members 412 and 414 of suitable nonelectrically conductive and nonmagnetic materials such as glass filled nylon for providing support strength and electrical isolation. These support members are fixedly connected to body 214 of magnetic assembly 206, as best illustrated in FIG. 5. A pair of wires (not shown) are connected by suitable means such as solder to the opposite ends of rigid members 408 and 410 providing electrical contact from the rigid members to these wires. The other ends of these wires are connected to terminal 92 with solder. This allows electrical continuity from the torque coil to the outside world and the electronics previously described with respect to the embodiment illustrated in FIGS. 1 to 4.

In addition to the various compononents just described, linear accelerometer mechanism 200 includes previously described pickoff coils 93 which, it should be quite apparent, are inductive type pickoff coils. These coils as previously described are provided for sensing the position of the pendulous assembly and like the previously described pickoff coils, they are located in confronting relationship with previously described conducting elements 41 and 42 at the points between the pivot axis and the torque coil, as best seen in FIG. 7. However, as will be seen below, whereas the pickoff coils in the previous embodiment were mounted to associated circuit boards, the pickoff coils in the present embodiment are mounted in an entirely different manner.

Turning specifically to FIG. 9 in conjunction with FIGS. 7 and 8, attention is specifically directed to the pickoff coil support assembly 600. This assembly includes a shaft or rod 602 which is constructed of a suitable ferromagnetic material such as steel and which includes at one end thereof a large disc shaped member 604 constructed of the same material, actually integral with the shaft in a preferred embodiment. A pickoff block 608 is cemented or otherwise suitably fastened to the front, exposed face of disc 604 and is constructed of a suitable insulating material such as glass filled nylon. As seen in FIG. 9, the pickoff coil 93 is connected to the front exposed face of block 608. A washer 610 of suitable insulating material such as glass filled nylon is cemented to and around shaft 602 directly under disc 604 and includes a circumferential groove along its outer surface for receiving a pair of electrically conductive, spaced tangs 612 and 614 which, as best seen in FIG. 10, are cemented within the groove on opposite sides of the washer and extend out a slight amount from the washer.

Turning to FIG. 7, it can be seen that the shaft or 214 (also see FIG. 5) of the magnetic assembly 206. After being properly positioned within this opening, the shaft or rod is held in place by means of set screw 618 located within the magnetic body and engaging the shaft at an angle thereto. The other pickoff assembly would be mounted in the same way in magnetic body 216 of assembly 208. Tap holes (not shown) in the shaft or rods at their free ends may be provided for allowing physical adjustment of the pickoff shaft by external means during assembly of the accelerometer mechanism.

Returning to FIG. 9, in conjunction with FIG. 5, it can be seen that the pickoff coil is electrically connected to its associated tangs by means of wires 620. The tangs, on the other hand, are connected to electrical wires (not shown) which lead to the outside world, specifically, the terminal 92 and where applicable other associated circuitry.

What is claimed is:

1. In a linear accelerometer mechanism a mounting flange having spaced parallel surfaces and an opening extending through the surfaces, removable means disposed in the opening in the mounting flange so that spaced portions of said removable means extend through said opening of the flange, said portions having spaced parallel surfaces extending at substantially right angles to the spaced parallel surfaces of the flange, said portions defining a space therebetween, said space extending through said opening, a pendulous moving system including a float, a pendulous elongate member having one end secured to the float, a cylindrical torque coil secured to the other end of the elongate member and a planar conducting element carried by the pendulous elongate member, means pivotally mounting the pendulous moving system to and between said portions of said removable means for movement about a pivot axis, magnetic means connected with said removable means and establishing a magnetic field about the torque coil, pickoff means fixedly disposed adjacent the planar conducting element, first and second covers disposed on opposite sides of the mounting flange and being secured to the mounting flange to provide a liquid-tight seal between the mounting flange and the covers to completely enclose said removable means and said pendulous moving system.

2. A mechanism as in claim 1 wherein said planar conducting element is carried by the pendulous member in a position which is between the portion of the outer perimeter of the torque coil nearest the axis of pivotal movement and the axis of pivotal movement of the pendulous member.

3. The mechanism as in claim 1 wherein said pendulous member is formed of an insulating material and wherein a planar conducting element is disposed on each of two opposite sides of the pendulous member and wherein said pickoff means is fixedly disposed adjacent each of the planar conducting elements.

4. A mechanism according to claim 1, wherein said magnetic means defines a substantially annular gap of predetermined axial length, said nagnetic means producing a linear magnetic field across said gap and wherein said cylindrical torque coil has a predetermined axial length and opposite sides which define the extent of said last-named length, said torque coil being configured to fit coaxially within said gap out of contact with said magnetic means, the axial length of said gap being at least about one and one-half times the axial length of said torque coil.

5. In a linear accelerometer mechanism, a mounting flange having spaced parallel surfaces and an opening extending through the surfaces, a removable body disposed in the opening in the mounting flange and being carried by the mounting flange so that portions of said body are disposed on opposite sides of the flange, said portions having spaced parallel surfaces extending at substantially right angles to the spaced parallel surfaces of the flange, said portions having an opening therein extending through the parallel surfaces, a pendulous moving system disposed in the opening in the body, said moving system including a float, a pendulous elongate member having one end secured to the float, a cylindrical coil secured to the other end of the pendulous member and a planar conducting element carried by the pendulous elongate member, means pivotally mounting the pendulous moving system in the body for movement about a pivot axis, magnetic means carried by the body and establishing a magnetic field about the torque coil, pickoff means carried by the body and disposed adjacent the planar conducting element, first and second covers disposed on opposite sides of the mounting flange and being secured to the mounting flange to provide a liquid-tight seal between the mounting flange and the covers to completely enclose the body and the pendulous moving system.

6. A mechanism as in claim 5 wherein said float and said arm are formed of an insulating material.

7. A mechanism as in claim 6 wherein said float and said arm are formed of glass-filled Nylon.

8. A mechanism as in claim 5 wherein said first and second covers enclose said portions of said body.

9. A mechanism as in claim 5 wherein a planar conducting element is disposed on opposite sides of the elongate pendulous member.

10. In a linear accelerometer mechanism, a housing, a pendulous elongate member formed of insulating material, means pivotally mounting said pendulous member in said housing about an axis located at a predetermined point along the length of said member, a cylindrical torque coil carried by and at one end of said pendulous member and float carried by and at the opposite end of said member, said float being formed of insulating material, magnet means for establishing a magnetic field in the vicinity of the torque coil, a planar conducting element carried by the pendulous elongate member in a position which is between the torque coil and the axis of pivotal movement located at said point of the pendulous member and inductive pickoff means mounted within the housing adjacent the planar conducting element.

11. The mechanism as in claim 10 wherein a planar conducting element is disposed on each of two opposite sides of the pendulous member at said predetermined point and wherein said inductive pickoff means includes an inductive pickoff coil carried by the housing in the vicinity of each of the planar conducting elements.

12. In a linear accelerometer mechanism,
(a) a mounting flange having spaced surfaces and an opening extending therethrough from one of said surfaces to the other,
(b) a pendulous moving system including a float, a pendulous elongate member extending through said opening and having one end secured to the float, a cylindrical torque coil secured to the other end of the pendulous member and a planar conducting element carried by the pendulous elongate member,
(c) magnetic means for establishing a magnetic field about the torque coil, said magnetic means being divided into first and second sections located adjacent one of said surfaces of and connected with said flange on opposite sides of said opening,
(d) first and second support means fixedly connected with said first and second sections of said magnetic means, respectively, and with said flange,
(e) means for pivotally mounting the pendulous moving system to said first and second supporting means for movement about a pivot axis,
(f) pickoff means carried by said magnetic means and disposed adjacent the planar conducting element, and
(g) first and second covers disposed on opposite sides of the mounting flange and being secured to the mounting flange to provide a liquid-tight seal between the mounting flange and the covers to completely enclose said magnetic means, said pendulous system and first and second support means.

13. A mechanism as in claim 12 wherein said float and said arm are formed of an insulating material.

14. A mechanism as in claim 13 wherein said float and said arm are formed of glass-filled Nylon.

15. A mechanism as in claim 12 wherein said system includes a second planar conducting element, said elements being disposed on opposite sides of the elongate pendulous member.

16. In a linear accelerometer mechanism,
(a) a housing,
(b) a pendulous moving system located within said housing and including an elongated pendulous member, a cylindrical torque coil carried on one end of said pendulous member and a float connected to and wider than the other end of said member, said float including a pair of flanges extending in the direction of and spaced from said pendulous member on opposite sides thereof, (c) means for pivotally mounting said pendulous moving system within said housing about a predetermined axis, said means including a pair of electrically conductive pivot pins mounted on said flanges, respectively, and together defining a pivot axis, (d) magnetic means located within said housing for establishing a magnetic field in the vicinity of said torque coil, (e) means for electrically sensing the position of said pendulous system, and (f) means for eletrically connecting said torque coil to two fixed points on said pivot axis and spaced from said pendulous system, said last-named means including (i) electrically conductive first and second leads connected to said torque coil and respectively extending therefrom to said pivot pins on said pivot axis, said leads being movable with said pendulous system, and (ii) electrically conductive first and second wires respectively connected to said pivot pins at said points on said axis and extending therefrom substantially coincident with said predetermined axis to said fixed points spaced from said pendulous system.

17. A mechanism as in claim 16 wherein said position sensing means includes an inductive pickoff coil and means for supporting said pickoff coil in a location between said predetermined pivot axis and said torque coil for sensing the position of said pendulous system.

18. A mechanism as in claim 17 wherein said pickoff coil support means includes a rod supporting said pickoff coil on one end and longitudinally movably positioned within an opening in said magnetic means and means for adjustably fixing the position of said rod within said opening whereby to adjust the position of said pickoff coil.

19. A mechanism as in claim 16 wherein said magnetic means defines a circumferential gap of predetermined axial length across which said magnetic field is produced and wherein said torque coil is configured to fit coaxially within said gap out of contact with said magnetic means, the axial length of said torque coil being less than said predetermined length of said gap.

20. In a linear accelerometer mechanism, (a) a housing, (b) a pendulous moving system located within said housing and including a pendulous member and a torque coil carried by said pendulous member, (c) means for pivotally mounting said pendulous moving system within said housing about a predetermined axis, (d) magnetic means located within said housing for establishing a magnetic field in the vicinity of said torque coil, (e) means for electrically sensing the position of said pendulous system, said means including a pickoff coil and means for supporting said pickoff coil in a location between said predetermined pivot axis and said torque coil, said supporting means including a rod formed of ferromagnetic material and an eletrically insulating disc carried on one end of said rod for supporting said pickoff coil on said one end, said rod being longitudinally movably positioned within an opening in said magnetic means, said supporting means also including means for adjustably fixing the position of said rod within said opening whereby to adjust the position of said pickoff coil.

21. In a linear accelerometer mechanism, (a) a housing, (b) a pendulous moving system located within said housing and including a pendulous member and cylindrical torque coil carried by said pendulous member, (c) means for pivotally mounting said pendulous moving system within said housing about a predetermined axis, (d) magnetic means located within said housing for establishing a magnetic field in the vicinity of said torque coil, (e) means for electrically sensing the position of said pendulous system, said position sensing means including an inductive pickoff coil and means for supporting said pickoff coil in a location between said predetermined pivot axis and said torque coil for sensing the position of said pendulous system, said pickoff coil support means including a rod supporting said pickoff coil on one end and longitudinally movably positioned within an opening in said magnetic means and means for adjustably fixing the position of said rod within said opening whereby to adjust the position of said pickoff coil, and (f) means for electrically connecting said torque coil to at least one fixed point on said pivot axis and spaced from said pendulous system, said last-named means including (i) electrically condutive means connected to said torque coil and extending therefrom to at least one point on said pivot axis, said conductive means being movable with said pendulous system, and (ii) electrically conductive wire means connected to said conductive means at said point on said axis and extending therefrom in an unconnected manner and substantially coincident with said predetermined axis to said fixed point spaced from said pendulous system.

22. In a linear accelerometer mechanism, (a) a housing, (b) a pendulous moving system located within said housing and including a pendulous member and a cylindrical torque coil carried by said pendulous member, (c) means for pivotally mounting said pendulous moving system within said housing about a predetermined axis, (d) magnetic means located within said housing for establishing a magnetic field in the vicinity of said torque coil, said magnetic means defining a circumferential gap of predetermined axial length across which said magnetic field is produced and wherein said torque coil is configured to fit coaxially within said gap out of contact with said magnetic means, the axial length of said torque coil being less than said predetermined length of said gap, (e) means for electrically sensing the position of said pendulous system, and (f) means for electrically connecting said torque coil to at least one fixed point on said pivot axis and spaced from said pendulous system, said last-named means including (i) electrically conductive means connected to said torque coil and extending therefrom to at least one point on said pivot axis, said conductive means being movable with said pendulous system, and (ii) electrically conductive wire means connected to said conductive means at said point on said axis and extending therefrom in an unconnected manner and substantially coincident with said predetermined axis to said fixed point spaced from said pendulous system.

23. A mechanism as in claim 22 wherein said predetermined axial length of said gap is at least one and one-half times the axial length of said torque coil.

* * * * *